(12) United States Patent
Hamano et al.

(10) Patent No.: US 8,718,683 B2
(45) Date of Patent: May 6, 2014

(54) APPARATUS FOR ACQUIRING CONTENT THROUGH WIRELESS COMMUNICATION

(75) Inventors: Yusuke Hamano, Kawasaki (JP); Katsuaki Akama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/564,635

(22) Filed: Aug. 1, 2012

(65) Prior Publication Data
US 2013/0035118 A1 Feb. 7, 2013

(30) Foreign Application Priority Data
Aug. 4, 2011 (JP) ................................. 2011-170868

(51) Int. Cl.
*H04W 64/00* (2009.01)
*H04W 24/00* (2009.01)

(52) U.S. Cl.
USPC ...... 455/456.6; 455/573; 455/458; 455/414.1

(58) Field of Classification Search
USPC ............................. 455/456.6, 573, 458, 414.1
See application file for complete search history.

(56) References Cited

U.S. PATENT DOCUMENTS

| 2006/0014529 | A1* | 1/2006 | Tomiya et al. | 455/414.1 |
| 2007/0135140 | A1* | 6/2007 | Tervo | 455/456.6 |
| 2007/0285260 | A1* | 12/2007 | Watanabe | 340/573.4 |
| 2008/0170543 | A1* | 7/2008 | Rossetti et al. | 370/329 |
| 2011/0081895 | A1* | 4/2011 | Ohashi | 455/414.1 |
| 2011/0256881 | A1* | 10/2011 | Huang et al. | 455/456.1 |
| 2011/0288936 | A1* | 11/2011 | Cumming | 705/14.58 |

FOREIGN PATENT DOCUMENTS

JP 2004-185091 A 7/2004

* cited by examiner

*Primary Examiner* — Jinsong Hu
*Assistant Examiner* — Jean Chang
(74) *Attorney, Agent, or Firm* — Maschoff Brennan

(57) ABSTRACT

A mobile wireless communication device that wirelessly communicates with a base station that provides wireless communication service includes a location information storage unit configured to store a location information, a content storage unit configured to store the content, a history storage unit configured to store history information, a determination unit configured to determine a possibility of transition from a current base station to in an outside zone of the wireless communication service, and an updating unit configured to acquire a content from the location information storage unit by using wireless communication service that is provided by the current base station, so as to update content of the content storage unit, when the determination unit determines that there is a possibility of transition to the state that the mobile wireless communication device is in the outside zone of the wireless communication service.

3 Claims, 8 Drawing Sheets

FIG. 4

| BASE STATION CELL ID | WIRELESS ESTABLISHMENT STARTING TIME | WIRELESS ESTABLISHMENT ENDING TIME |
|---|---|---|
| 15 | 2.20.2011 06:00:00 | 2.20.2011 08:10:00 |
| 16 | 2.20.2011 08:10:00 | 2.20.2011 08:50:11 |
| OUT-OF-ZONE | | |
| 16 | 2.20.2011 09:10:00 | 2.20.2011 09:30:12 |

APPARATUS FOR ACQUIRING CONTENT THROUGH WIRELESS COMMUNICATION

CROSS-REFERENCE TO RELATED APPLICATIONS

This application is based upon and claims the benefit of priority of the prior Japanese Patent Application No. 2011-170868, filed on Aug. 4, 2011, the entire contents of which are incorporated herein by reference.

FIELD

The embodiments discussed herein are related to a mobile wireless communication device and a medium.

BACKGROUND

There are mobile wireless communication devices in related art that access a specific site at predetermined time in accordance with access setting to a specific site on network to acquire data. Examples of related art are discussed in Japanese Laid-open Patent Publication No. 2004-185091, for example.

However, mobile wireless communication devices of related art have such problems that when a period to access a specific site is long, it is difficult for the mobile wireless communication devices to acquire latest information before moving to the outside of a range in which the mobile wireless communication devices can wirelessly communicate with a base station, that is, to an outside zone of wireless communication service. On the other hand, when a period to access a specific site is short, access is frequently performed, causing a problem of heavy battery consumption.

SUMMARY

According to an aspect of the embodiments, an apparatus includes a mobile wireless communication device that wirelessly communicates with a base station that provides wireless communication service including: a location information storage unit configured to store a location information, a content storage unit configured to store the content, a history storage unit configured to store history information, a determination unit configured to determine a possibility of transition from a current base station to in an outside zone of the wireless communication service, and an updating unit configured to acquire a content from the location information storage unit by using wireless communication service that is provided by the current base station, so as to update content of the content storage unit, when the determination unit determines that there is a possibility of transition to the state that the mobile wireless communication device is in the outside zone of the wireless communication service.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a base station wireless establishment history table of the mobile wireless communication device according to Embodiment 2.

DESCRIPTION OF EMBODIMENTS

Figure 1:
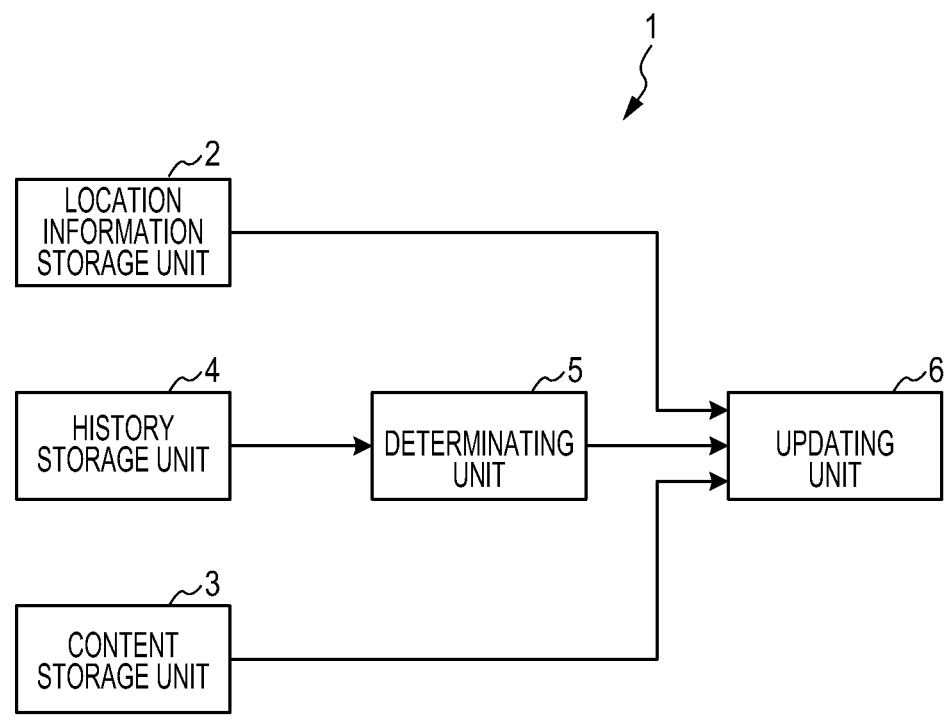
FIG. 1 is a block diagram illustrating main parts of a mobile wireless communication device according to Embodiment 1.

Embodiments of a mobile wireless communication device and a computer-readable recording medium will be described in detail below with reference to the accompanying drawings. In the following description of the respective embodiments, like elements will have the same reference numerals and duplicate description thereof will be skipped.

Embodiment 1

Description of Mobile Wireless Communication Device

FIG. 1 is a block diagram illustrating main parts of a mobile wireless communication device according to Embodiment 1. As depicted in FIG. 1, a mobile wireless communication device 1 can wirelessly communicate with a base station which is not depicted. The base station provides wireless communication service. The mobile wireless communication device 1 includes a location information storage unit 2, a content storage unit 3, a history storage unit 4, a determination unit 5, and an updating unit 6.

The location information storage unit 2 stores location information indicating a location of content of the wireless communication service. The content storage unit 3 stores content which is acquired from a location indicated in location information. The history storage unit 4 stores history information which is history about establishment of wireless communication with a base station.

The determination unit 5 determines a possibility of transition from a state that wireless communication with a current base station is established to a state that the mobile wireless communication device 1 is in an outside zone of the wireless communication service. When the determination unit 5 determines that there is a possibility that the mobile wireless communication device 1 moves to the outside zone of the wireless communication service, the updating unit 6 acquires content from a location indicated in location information which is stored in the location information storage unit 2 by using wireless communication service which is provided by the current base station and updates contents of the content storage unit 3.

According to Embodiment 1, the mobile wireless communication device 1 acquires content by using the wireless communication service which is provided by the current base station when there is a possibility that the mobile wireless communication device 1 moves to the outside zone of the wireless communication service, so that the mobile wireless communication device 1 can acquire information before moving to the outside zone of the wireless communication service. Further, such state that the mobile wireless communication device 1 frequently acquires contents even when there is no possibility to move to the outside zone of the wireless communication service can be avoided, so that battery consumption of the mobile wireless communication device 1 can be suppressed.

Embodiment 2

An example of the mobile wireless communication device 1 is a mobile telephone. Further, examples of content are news and information of blog and twitter that can be referred to via the Internet.

Description of Hardware Configuration of Mobile Wireless Communication Device

Figure 2:
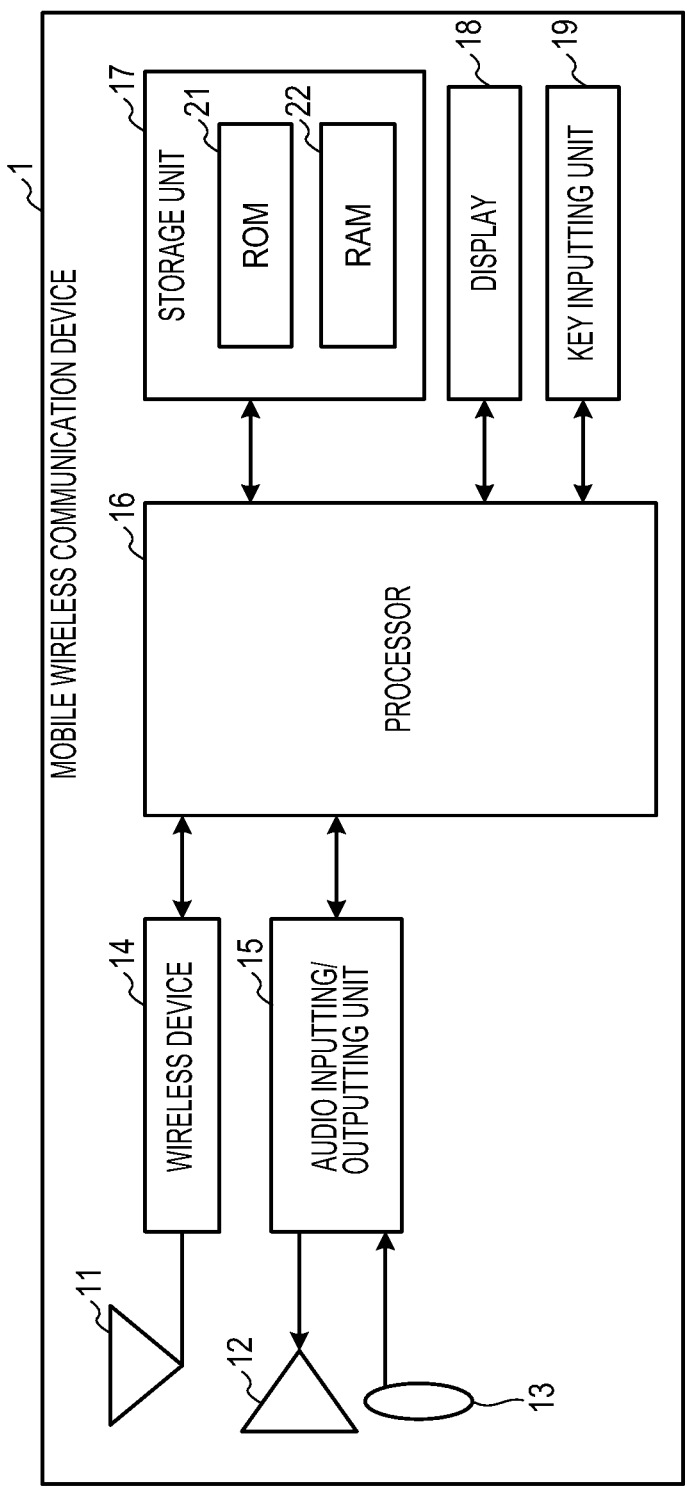
FIG. 2 is a block diagram illustrating the hardware configuration of a mobile wireless communication device according to Embodiment 2.

FIG. 2 is a block diagram illustrating the hardware configuration of a mobile wireless communication device according to Embodiment 2. As depicted in FIG. 2, the mobile wireless communication device 1 includes an antenna 11, a speaker 12, a microphone 13, a wireless device 14, an audio inputting/outputting unit 15, a processor 16, a storage unit 17, a display 18, and a key inputting unit 19.

The processor 16 executes record processing of base station wireless establishment history, deleting processing of base station wireless establishment history, content prefetch processing, and setting processing of an important pattern. The record processing of base station wireless establishment history, the deleting processing of base station wireless establishment history, the content prefetch processing, and the setting processing of an important pattern will be described later.

The antenna 11 is connected with the wireless device 14. The wireless device 14 is connected with the processor 16 and performs transmission processing and reception processing. When the wireless device 14 receives notification information which is broadcasted from a base station, for example, the wireless device 14 notifies the processor 16 of control information which is used for start of communication of the mobile wireless communication device 1 such as a cell identifier (ID) included in the notification information.

The storage unit 17 is connected with the processor 16 and includes a read only memory (ROM) 21 and a random access memory (RAM) 22. An example of the ROM 21 is a rewritable nonvolatile memory such as a flash memory.

In the ROM 21, programs to make the processor 16 execute the above-described record processing of base station wireless establishment history, deleting processing of base station wireless establishment history, content prefetch processing, and setting processing of an important pattern are stored. In the ROM 21, the location information, the content, and the history information which are described in Embodiment 1, for example, are stored. The RAM 22 is used as an operation area of the processor 16.

The speaker 12 and the microphone 13 are connected with the audio inputting/outputting unit 15. The audio inputting/outputting unit 15 is connected with the processor 16 and performs processing about output and input of sound. The display 18 is connected with the processor 16 and displays a processing result in the processor 16. The key inputting unit 19 is connected with the processor 16 and receives key input from a user.

Description of Functional Configuration of Mobile Wireless Communication Device

Figure 3:
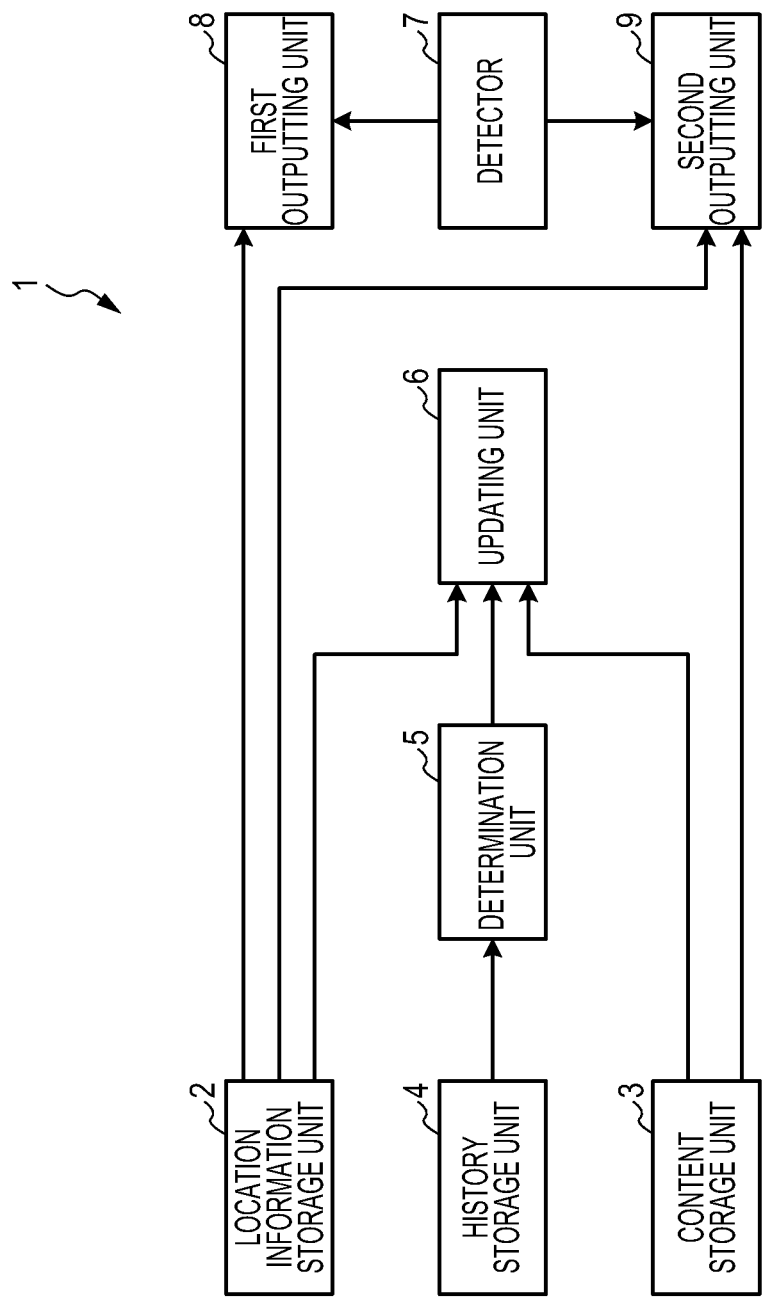
FIG. 3 is a block diagram illustrating the functional configuration of main parts of the mobile wireless communication device according to Embodiment 2.

FIG. 3 is a block diagram illustrating the functional configuration of main parts of the mobile wireless communication device according to Example 2. As depicted in FIG. 3, the mobile wireless communication device 1 includes a detector 7, a first outputting unit 8, and a second outputting unit 9 in addition to the location information storage unit 2, the content storage unit 3, the history storage unit 4, the determination unit 5, and the updating unit 6 which are described in Embodiment 1.

The determination unit 5, the updating unit 6, the detector 7, the first outputting unit 8, and the second outputting unit 9 may be realized when the processor 16 executes the above-described record processing of base station wireless establishment history, deleting processing of base station wireless establishment history, content prefetch processing, and setting processing of an important pattern. The location information storage unit 2, the content storage unit 3, and the history storage unit 4 may be realized by the ROM 21 of the storage unit 17 or by the ROM 21 and the RAM 22.

The content may be an information source on the Internet, for example. The location information may be a uniform resource locator (URL) indicating a location of an information source on the Internet, for example. An example of the history storage unit 4 is a base station wireless establishment history table which will be described later, for example.

When the detector 7 is notified of control information such as a cell ID from the wireless device 14, for example, the detector 7 detects that the mobile wireless communication device 1 is present in a zone of wireless communication service which is provided by a base station having the cell ID. When the detector 7 is not notified of control information such as a cell ID from the wireless device 14, for example, the detector 7 detects that the mobile wireless communication device 1 is not present in the zone of the wireless communication service, that is, the mobile wireless communication device 1 is in an outside zone of the wireless communication service.

The first outputting unit 8 outputs content in the case where the mobile wireless communication device 1 is not present in the zone of the wireless communication service. The first outputting unit 8 acquires content which is stored in the content storage unit 3 from the content storage unit 3 in response to a request to acquire content based on location information. The first outputting unit 8 outputs the content acquired from the content storage unit 3 to the display 18 and the speaker 12.

The second outputting unit 9 outputs content in the case where the mobile wireless communication device 1 is present in the zone of the wireless communication service. The second outputting unit 9 acquires content from a location which is indicated in location information by using the wireless communication service, in response to a request to acquire content based on the location information. The second outputting unit 9 outputs the content acquired by wireless communication with the base station to the display 18 and the speaker 12.

When the mobile wireless communication device 1 is present in the zone of the wireless communication service, the determination unit 5 collates information such as a cell ID about a current base station with which wireless communication is established with base station information such as a cell ID which has been stored in the history storage unit 4 before detecting that the mobile wireless communication device 1 is not present in the zone of the wireless communication service. Then, the determination unit 5 determines a possibility of transition from a state that wireless communication with the current base station is established to a state that the mobile wireless communication device 1 is in the outside zone of the wireless communication service. When the determination unit 5 determines that there is a possibility that the mobile wireless communication device 1 moves to the outside zone, the determination unit 5 notifies the updating unit 6.

When the updating unit 6 receives the notification from the determination unit 5, the updating unit 6 downloads content which is to be updated and updates corresponding content which is stored in the content storage unit 3. A user may set in advance content which is to be updated. Alternatively, the processor 16 may record content to which a user routinely refers in the storage unit 17 and refer to the record so that the updating unit 6 automatically acquires the content. The content to be updated or the content which is automatically acquired may be recorded in a content acquisition table which is not depicted. The content acquisition table may be stored in the ROM 21 and the RAM 22, for example.

Description of Base Station Wireless Establishment History Table

FIG. 4 is a diagram illustrating a base station wireless establishment history table of the mobile wireless communication device according to Embodiment 2. As depicted in FIG. 4, in a base station wireless establishment history table 10, cell IDs of base stations, time at which establishment of communication of a wireless layer with a base station is started, and time at which establishment of wireless communication is ended by handoff are stored for every cell ID in the order that wireless communication with the mobile wireless communication device is established. In a case where the mobile wireless communication device does not establish wireless communication with any base station, "out-of-zone" is stored as a cell ID in the base station wireless establishment history table 10.

In an example illustrated in FIG. 4, the mobile wireless communication device 1 is connected with a base station of cell ID=15 from 06:00:00 on Feb. 20, 2011 to 08:10:00 of the same day by wireless communication, for example. Subsequently, by handover, the mobile wireless communication device 1 is connected with a base station of cell ID=16 from 08:10:00 of the same day to 08:50:11 of the same day by wireless communication, for example. Then, after moving to an outside zone once due to movement by a train such as subway, for example, the mobile wireless communication device 1 is connected with the base station of cell ID=16 again at 09:10:00 of the same day by wireless communication and ends the connection by the wireless communication at 09:30:12 of the same day in the history.

In the example illustrated in FIG. 4, when the mobile wireless communication device 1 is connected with the base station of cell ID=15 by wireless communication and subsequently connected with the base station of cell ID=16 by wireless communication, the determination unit 5 can determine that the mobile wireless communication device 1 next moves to the outside zone by referring to the base station wireless establishment history table 10, for example. In this case, the determination unit 5 can determine that the mobile wireless communication device 1 moves to the outside zone about 40 minutes later from time at which establishment of wireless communication with the base station of cell ID=16 is started.

The determination unit 5 may consider not only cell IDs but also a time period of connection by wireless communication with a base station of each cell ID. The time period of connection by wireless communication can be obtained from difference between time at which establishment of wireless communication is ended and time at which establishment of wireless communication is started. For example, when the mobile wireless communication device 1 is connected with the base station of cell ID=15 by wireless communication for about two hours and subsequently connected with the base station of cell ID=16 by wireless communication, the determination unit 5 may determine that the mobile wireless communication device 1 subsequently moves to the outside zone.

Alternatively, the determination unit 5 may consider not only cell IDs but also establishment starting time of connection by wireless communication with a base station of each cell ID. For example, when the mobile wireless communication device 1 starts connection by wireless communication with the base station of cell ID=15 at about 6:00 a.m. and then starts connection by wireless communication with the base station of cell ID=16 at about 8:10 a.m., the determination unit 5 may determine that the mobile wireless communication device 1 subsequently moves to the outside zone.

Alternatively, the determination unit 5 may consider not only cell IDs but also establishment ending time of connection by wireless communication with a base station of each cell ID. For example, when the mobile wireless communication device 1 ends connection by wireless communication with the base station of cell ID=15 at about 8:10 a.m. and then is connected with the base station of cell ID=16 by wireless communication, the determination unit 5 may determine that the mobile wireless communication device 1 subsequently moves to the outside zone.

Alternatively, the determination unit 5 may determine not only by cell IDs but also by combination of two or more conditions which are a time period of connection by wireless communication with a base station of each cell ID, establishment starting time of connection by wireless communication, and establishment ending time of connection by wireless communication. Thus, the determination unit 5 can more accurately determine that the mobile wireless communication device 1 moves to the outside zone by taking into consideration of information of time or a time period of connection by wireless communication in addition to cell IDs.

In a similar manner, the determination unit 5 may determine that the mobile wireless communication device 1 subsequently moves to the outside zone on the basis not only of a cell ID acquired immediately before the mobile wireless communication device 1 to be in an out-of-zone state but also of transition patterns of several cell IDs obtained before the mobile wireless communication device 1 to be in the out-of-zone state. In this case, determination unit 5 may determine that the mobile wireless communication device 1 is more likely to move to the outside zone at more previous time than acquisition time of a cell ID acquired immediately before the mobile wireless communication device 1 to be in the out-of-zone state, such as time at which the mobile wireless communication device 1 is connected by wireless communication with a base station of a two or three previous cell ID before transition to the out-of-zone state.

When the determination unit 5 performs determination at more previous time than acquisition time of a cell ID acquired immediately before the mobile wireless communication device 1 to be in the out-of-zone state, the updating unit 6 may acquire content by using wireless communication service which is provided by a base station at that time and update content of the content storage unit 3 at the time of the execution of the determination of the determination unit 5. Accordingly, even when time for downloading of content is longer than connecting time by wireless communication with a base station of a cell ID acquired immediately before the mobile wireless communication device 1 to be in the out-of-zone state, content can be downloaded.

Further, when a cell ID of a base station with which the mobile wireless communication device 1 is currently connected by wireless communication is accorded with a cell ID acquired immediately before the mobile wireless communication device 1 to be in the out-of-zone state in the base station wireless establishment history table 10, the determination unit 5 may determine that mobile wireless communication device 1 subsequently moves to the outside zone. In the example illustrated in FIG. 4, when the mobile wireless communication device 1 is connected with the base station of cell ID=16 by wireless communication, for example, the determination unit 5 may determine that the mobile wireless communication device 1 moves to the outside zone about 40 minutes later. In this case as well, the determination unit 5 may perform determination by considering not only cell IDs but also time of establishment of connection by wireless communication with a base station of a cell ID acquired immediately before the mobile wireless communication device 1 to be in the out-of-zone state. Further, since a cell ID acquired immediately before the mobile wireless communication device 1 to be in the out-of-zone state is the reference of determination, only a cell ID acquired immediately before being in the out-of-zone state may be recorded in the base station wireless establishment history table 10.

Description of Recording Processing of Base Station Wireless Establishment History The base station wireless establishment history table 10 is formed or updated by recording processing of base station wireless establishment history. The mobile wireless communication device 1 may once form the base station wireless establishment history table 10 along a user's behavioral pattern such as a commutation route to company or school, before the determination unit 5 starts processing of determining transition to the outside zone. The mobile wireless communication device 1 may not update the base station wireless establishment history table 10 which is formed or may regularly update the base station wireless establishment history table 10. In the description here, the mobile wireless communication device 1 regularly updates the base station wireless establishment history table 10.

Figure 5:
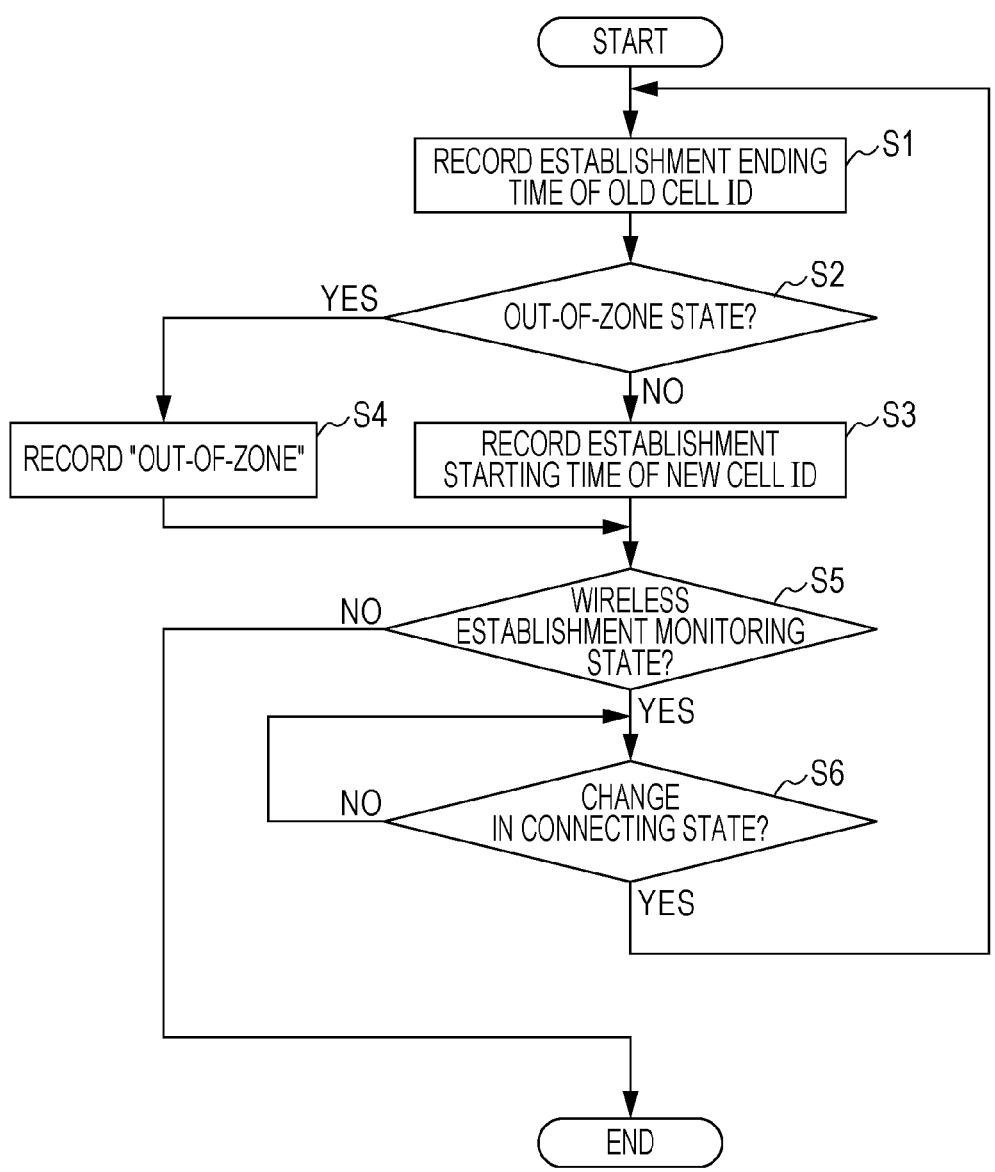
FIG. 5 is a flowchart illustrating recording processing of base station wireless establishment history in the mobile wireless communication device according to Embodiment 2.

FIG. 5 is a flowchart illustrating recording processing of base station wireless establishment history in the mobile wireless communication device according to Embodiment 2. As depicted in FIG. 5, when recording processing of base station wireless establishment history is started, the mobile wireless communication device 1 first records time at which establishment of wireless communication is ended regarding a cell ID of a base station, in the zone of which the mobile wireless communication device 1 has been most currently present, in the base station wireless establishment history table 10 (step S1).

Subsequently, when the mobile wireless communication device 1 is in an in-zone state (step S2: No), the mobile wireless communication device 1 records a cell ID of a base station with which wireless communication is newly established and time at which establishment of wireless communication is started regarding the cell ID, in the base station wireless establishment history table 10 (step S3). On the other hand, when the mobile wireless communication device 1 is in the out-of-zone state (step S2: Yes), the mobile wireless communication device 1 records "out-of-zone" in the base station wireless establishment history table 10 (step S4).

Subsequent to step S3 or step S4, when the mobile wireless communication device 1 is in a state to monitor establishment of wireless communication (step S5: Yes), the mobile wireless communication device 1 keeps the state as it is until an occurrence of change in the connecting state in wireless communication such as transition from the in-zone state to the out-of-zone state or from the out-of-zone state to the in-zone state and change in a cell ID of a base station which is connected by wireless communication (step S6: No).

When the connecting state by wireless communication changes (step S6: Yes), the process returns to step S1 and processing from step S1 is repeated. Subsequent to step S3 or step S4, when the mobile wireless communication device 1 is not in the state to monitor establishment of wireless communication (step S5: No), the mobile wireless communication device 1 ends a series of processing. The mobile wireless communication device 1 can record a route in which the mobile wireless communication device 1 moves, by performing the recording processing of base station wireless establishment history.

Description of Setting Processing of Important Pattern

Figure 6:
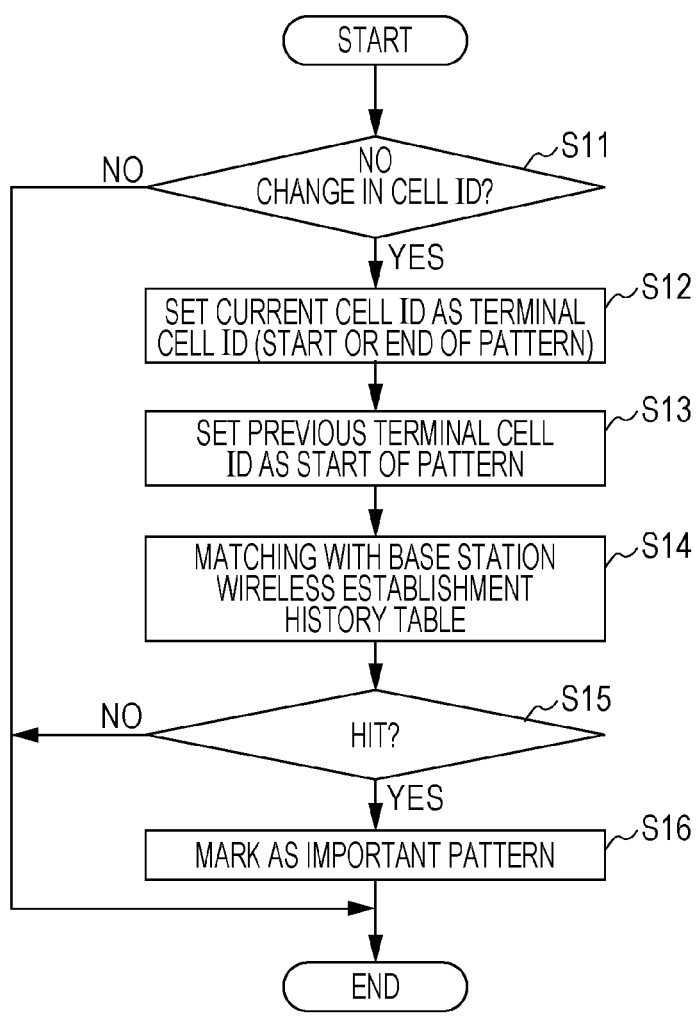
FIG. 6 is a flowchart illustrating setting processing of an important pattern in the mobile wireless communication device according to Embodiment 2.

FIG. 6 is a flowchart illustrating setting processing of an important pattern in the mobile wireless communication device according to Embodiment 2. As depicted in FIG. 6, after the start of setting processing of an important pattern, when a cell ID has not changed for a predetermined period (step S11: Yes), the mobile wireless communication device 1 first sets a current cell ID as a terminal cell indicating start or end of a moving pattern of the mobile wireless communication device 1 (step S12). This is because there is a possibility that a current cell ID indicates start or end of a certain moving pattern when a current cell ID has not changed for a predetermined period.

Subsequently, the mobile wireless communication device 1 sets a cell ID (terminal cell ID) which has been previously set as a terminal cell, as a terminal cell indicating start of a current moving pattern (step S13). Accordingly, history from the previous terminal cell ID to the current terminal cell ID is set as one moving pattern. Then, the mobile wireless communication device 1 performs matching of the moving pattern which is set in step S13 with the base station wireless establishment history table 10 (step S14).

In a case of hit in the result of the matching, that is, in a case where the moving pattern which is set in step S13 is present in the base station wireless establishment history table 10 (step S15: Yes), the mobile wireless communication device 1 marks the moving pattern which is set in step S13 as an important pattern (step S16). Then, the mobile wireless communication device 1 ends a series of processing.

Further, in a case where the cell ID changes (step S11: No) or a case of no hit in the result of the matching (step S15: No), the mobile wireless communication device 1 ends the series of processing. The mobile wireless communication device 1 can set user's daily moving pattern such as commute to company or school as a more important pattern than other irregular moving patterns, by performing the setting processing of an important pattern. The mobile wireless communication device 1 may record the number of hits in matching of step S14 for every pattern in the base station wireless establishment history table 10, for example, and raise a level of importance of a pattern as the number of hits of the pattern is larger.

Figure 7:
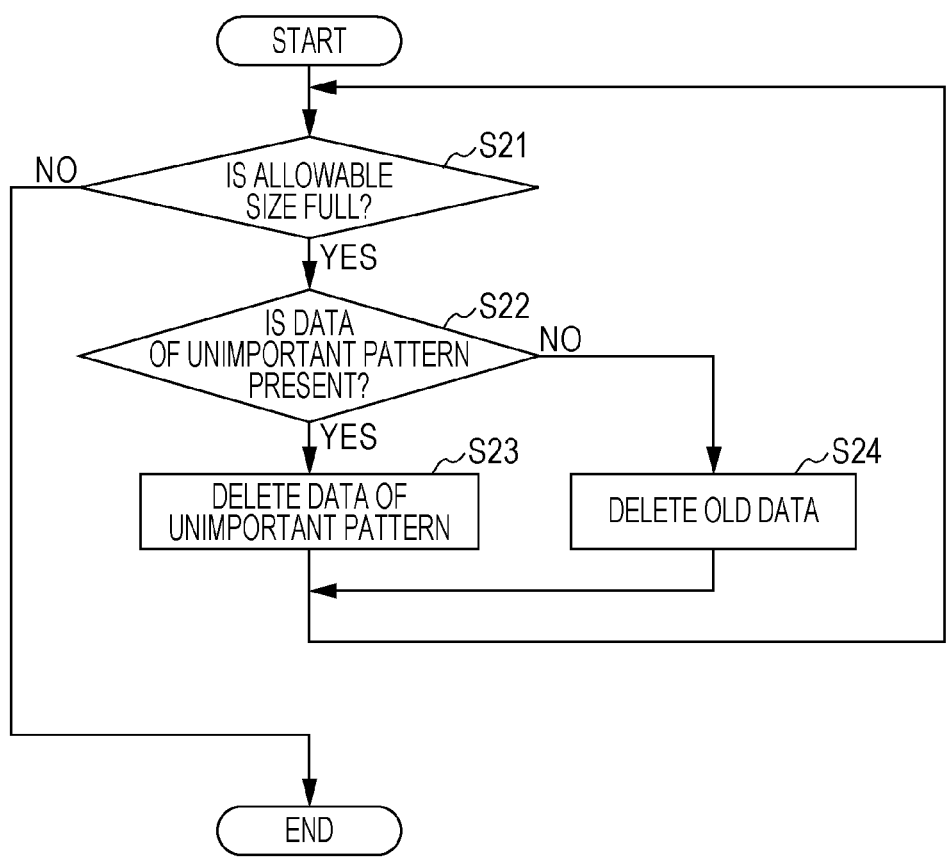
FIG. 7 is a flowchart illustrating deleting processing of base station wireless establishment history in the mobile wireless communication device according to Embodiment 2.

Description of Deleting Processing of Base Station Wireless Establishment History FIG. 7 is a flowchart illustrating deleting processing of base station wireless establishment history in the mobile wireless communication device according to Embodiment 2. As depicted in FIG. 7, after the start of the deleting processing of base station wireless establishment history, when the base station wireless establishment history table 10 is full of data of allowable size which is set in advance (step S21: Yes) and data which is not marked as an important pattern is present in the base station wireless establishment history table 10 (step S22: Yes), the mobile wireless communication device 1 deletes data which is not marked as an important pattern (step S23).

When the level of importance of a pattern is set in accordance with the number of hits in the above-described setting processing of an important pattern, the mobile wireless communication device 1 may delete a pattern having a lower level of importance, for example. The mobile wireless communication device 1 may delete a single pattern of a low level of importance or may delete a plurality of patterns in ascending order of importance until the base station wireless establishment history table 10 has free space of predetermined ratio to the allowable size, for example.

When data which is not marked as an important pattern is not present in the base station wireless establishment history table 10 (step S22: No), the mobile wireless communication device 1 deletes old data (step S24). The mobile wireless communication device 1 may delete a piece of old data or may delete a plurality of pieces of data in order of oldness until the base station wireless establishment history table 10 has the free space of predetermined ratio to the allowable size, for example.

After data which is not marked as an important pattern, or old data is deleted, the process returns to step S21 and the processing from step S21 is repeated. When the base station wireless establishment history table 10 is not full of data of allowable size (step S21: No), the mobile wireless communication device 1 ends the series of processing. The mobile wireless communication device 1 can update the base station wireless establishment history table 10 with a new moving pattern on a continuous basis because the mobile wireless communication device 1 can produce a free space in the base station wireless establishment history table 10 by performing the deleting processing of base station wireless establishment history.

Description of Content Prefetch Processing

Figure 8:
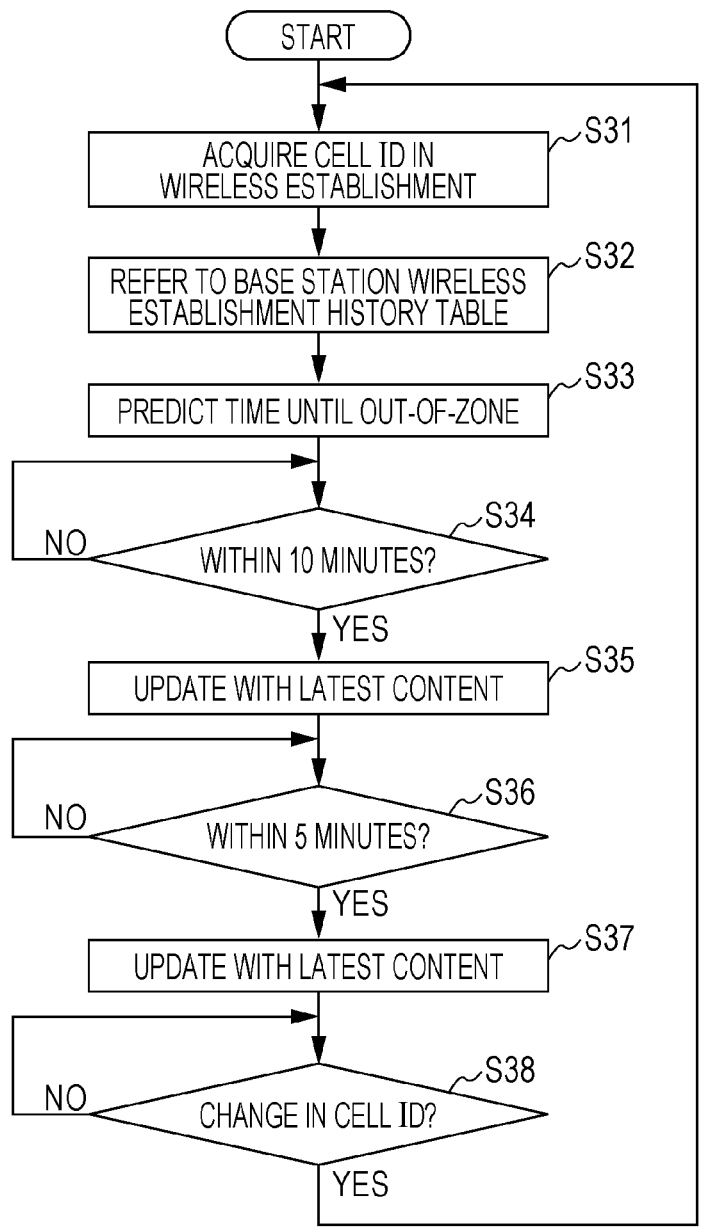
FIG. 8 is a flowchart illustrating content prefetch processing in the mobile wireless communication device according to Embodiment 2.

FIG. 8 is a flowchart illustrating content prefetch processing in the mobile wireless communication device according to Embodiment 2. As depicted in FIG. 8, when a user refers to content on the Internet by browser, for example, the content prefetch processing is started. When the content prefetch processing is started, the mobile wireless communication device 1 first acquires a cell ID of a base station with which the mobile wireless communication device 1 currently establishes wireless communication, from the wireless device 14 (step S31).

The mobile wireless communication device 1 refers to the base station wireless establishment history table 10 by using the acquired cell ID as a key (step S32). Then, the mobile wireless communication device 1 predicts a period of time until the mobile wireless communication device 1 is next in the out-of-zone state (step S33). The mobile wireless communication device 1 may predict the period of time until the mobile wireless communication device 1 is next in the out-of-zone state by integrating connecting time of respective records which are records from a record corresponding to the cell ID acquired in step S31 to a record of first "out-of-zone" among records which are recorded after the record of the acquired cell ID, in the base station wireless establishment history table 10. The mobile wireless communication device 1 may set the shortest time as a predicted time when there is a plurality of predicted time.

The mobile wireless communication device 1 predicts a period of time until the mobile wireless communication device 1 is next in the out-of-zone state and starts clocking by a timer which is incorporated in the processor 16, for example. Then, the mobile wireless communication device 1 stands by until remaining time of the predicted period until the mobile wireless communication device 1 is next in the out-of-zone state becomes equal to or less than predetermined time, for example, 10 minutes or less (step S34: No). When the remaining time becomes equal to or less than predetermined time (step S34: Yes), the mobile wireless communication device 1 refers to a content acquisition table, for example, and updates content stored in the content storage unit 3 with the latest content by downloading corresponding content (step S35).

Subsequently, the mobile wireless communication device 1 stands by until remaining time of the predicted period until the mobile wireless communication device 1 is next in the out-of-zone state becomes equal to or less than predetermined time, for example, 5 minutes (step S36: No). When the remaining time becomes equal to or less than the predetermined time (step S36: Yes), the mobile wireless communication device 1 updates, similarly to step 35, content with the latest content (step S37). Thus, the mobile wireless communication device 1 can update the content with the latest content by performing content update plural times in accordance with remaining time of the predicted period until the mobile wireless communication device 1 is next in the out-of-zone state.

After the content update is ended, the mobile wireless communication device 1 stands by until a cell ID changes, that is, until a base station with which the mobile wireless communication device 1 establishes wireless communication changes (step S38: No). When a cell ID changes (step S38: Yes), the mobile wireless communication device 1 returns to step S31 and repeats processing from step S31. The mobile wireless communication device 1 can update content before the mobile wireless communication device 1 is next in the out-of-zone state, by performing the content prefetch processing.

In Embodiment 2 as well, the mobile wireless communication device 1 acquires content by using the wireless communication service which is provided by a current base station when there is a possibility that the mobile wireless communication device 1 moves to the outside zone of the wireless communication service, as is the case with Embodiment 1. Accordingly, the mobile wireless communication device 1 can acquire information before moving to the outside zone of the wireless communication service. Further, such state that the mobile wireless communication device 1 frequently acquires contents even when there is no possibility that the mobile wireless communication device 1 moves to the outside zone of the wireless communication service can be avoided, so that battery consumption of the mobile wireless communication device 1 can be suppressed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile wireless communication device that wirelessly communicates with one or more base stations that provide wireless communication service, the mobile wireless communication device comprising:

a location information storage unit configured to store a location information that indicates a location of content of the wireless communication service;

a content storage unit configured to store the content that is acquired from a location indicated in the location information;

a history storage unit configured to store history information including a predetermined order of history records, each including a cell identifier (ID) identifying one of the one or more base stations in association with a time period during which wireless communication is established with the one of the one or more base stations;

a determination unit configured to determine a possibility of transition of the mobile wireless communication device from a state that wireless communication with a current base station is established to a state that the mobile wireless communication device is in an outside zone of the wireless communication service, the determination unit being configured to determine the possibility of transition on the basis of a current cell ID received from the current base station and included in the predetermined order of history records included in the history information and on the basis of a previous amount of time of establishment of wireless communication of the mobile wireless communication device with the current base station when the current base station was a last base station with which the mobile wireless communication device had established wireless communication before a previous transition to the state that the mobile wireless communication device is in the outside zone of the wireless communication service; and an updating unit configured to acquire a content from the location indicated in the location information that is stored in the location information storage unit, by using wireless communication service that is provided by the current base station, so as to update content of the content storage unit, when the determination unit determines that there is a possibility of transition to the state that the mobile wireless communication device is in the outside zone of the wireless communication service.

2. The mobile wireless communication device according to claim 1, further comprising:

a detector configured to detect whether the mobile wireless communication device is in a zone of the wireless communication service, based on the current cell ID received from the current base station;

a first outputting unit configured to output a content that is stored in the content storage unit in response to a request to acquire content based on the location information, in a case of the mobile wireless communication device being in the outside zone of the wireless communication service; and a second outputting unit configured to acquire a content from a location that is indicated in the location information by using the wireless communication service in response to a request to acquire content based on the location information, so as to output the content that is acquired by wireless communication with the base station, in a case of the mobile wireless communication device being in an inside zone of the wireless communication service; wherein in a case of the mobile wireless communication device being in the inside zone of the wireless communication service, the determination unit collates information of a current base station with which wireless communication is established with base station information that has been stored in the history storage unit before detecting the state of the mobile wireless communication device being in the outside zone of the wireless communication service, so as to determine a possibility of transition from the state that wireless communication with the current base station is established to the state that the mobile wireless communication device is in the outside zone of the wireless communication service.

3. A non-transitory computer-readable recording medium having stored therein a program for causing a computer to execute a process in a mobile wireless communication device that wirelessly communicates with one or more base stations that provide wireless communication service, the process comprising:

storing a location information that indicates a location of content of the wireless communication service;

storing the content that is acquired from a location indicated in the location information;

storing a history information including a predetermined order of history records, each including a cell identifier (ID) identifying one of the one or more base stations in association with a time period during which wireless communication is established with the one of the one or more base stations;

determining a possibility of transition of a mobile wireless communication device from a state that wireless communication with a current base station is established to a state that the mobile wireless communication device is in an outside zone of the wireless communication service, the possibility of transition being determined on the basis of a current cell ID received from the current base station and included in the predetermined order of history records included in the history information and on the basis of a previous amount of time of establishment of wireless communication of the mobile wireless communication device with the current base station when the current base station was a last base station with which the mobile wireless communication device had established wireless communication before a previous transition to the state that the mobile wireless communication device is in the outside zone of the wireless communication service;

acquiring a content from a location indicated in the location information by using wireless communication service that is provided by the current base station, when it is determined that there is a possibility of transition to the state that the mobile wireless communication device is in an outside zone of the wireless communication; and updating the content.

* * * * *